US005623558A

United States Patent [19]
Billawala et al.

[11] Patent Number: 5,623,558
[45] Date of Patent: Apr. 22, 1997

[54] RESTORATION OF IMAGES WITH UNDEFINED PIXEL VALUES

[75] Inventors: Nazneen Billawala, Cupertino; Peter Hart; Mark Peairs, both of Menlo Park, all of Calif.

[73] Assignees: Ricoh Company, Ltd., Tokyo, Japan; Ricoh Corporation, Menlo Park, Calif.

[21] Appl. No.: 335,515

[22] Filed: Nov. 7, 1994

Related U.S. Application Data

[63] Continuation of Ser. No. 45,954, Apr. 12, 1993, abandoned.

[51] Int. Cl.⁶ ................................................ G06K 9/40
[52] U.S. Cl. .................................... 382/254; 382/275
[58] Field of Search .............................. 382/270, 271, 382/272, 275, 264, 254; 358/447; 348/615, 616

[56] References Cited

U.S. PATENT DOCUMENTS

| | | | |
|---|---|---|---|
| 4,298,895 | 11/1981 | Arai et al. | 382/54 |
| 4,601,056 | 7/1986 | Habitzreiter et al. | 382/50 |
| 4,866,785 | 9/1989 | Shibano | 382/51 |
| 4,979,136 | 12/1990 | Weiman et al. | 382/54 |
| 5,017,763 | 5/1991 | Shepard | 235/432 |
| 5,115,475 | 5/1992 | Lebeau | 382/8 |
| 5,140,650 | 8/1992 | Casey et al. | 382/61 |
| 5,214,470 | 5/1993 | Denber | 382/54 |
| 5,229,589 | 7/1993 | Schneider | 235/456 |
| 5,237,628 | 8/1993 | Levitan | 382/61 |

Primary Examiner—Yon J. Couso
Attorney, Agent, or Firm—Philip H. Albert; Townsend and Townsend and Crew LLP

[57] ABSTRACT

A system for restoring images with undefined pixel values at known locations is described. The threshold value and a neighborhood configuration are defined and are used to restore the image. The neighborhood configuration defines a geometric region, typically a fixed number of pixels, surrounding the target pixel. The threshold value specifies a number of pixels in the neighborhood configuration for which pixel values are known. In our system, for each pixel in one of the unknown regions an analysis is performed over the entire area defined by the neighborhood configuration. If the threshold number of pixels within that region is known, then the value of the unknown pixel is calculated. If the threshold value is not achieved, then analysis proceeds to the next pixel location. By continuing the process and reducing the threshold value when necessary or desirable, the complete image can be restored.

13 Claims, 9 Drawing Sheets

FIG. 3 fghijklmnopqrstuvwxyzAB
UVWXYZ&!1234567890$
ned in 1955 by Adrian Frutig fghijklmnopqrstuvwxyzAB
UVWXYZ&!1234567890$
ned in 1955 by Adrian Frutig fghijklmnopqrstuvwxyzAB
UVWXYZ&!1234567890$
ned in 1955 by Adrian Frutig fghijklmnopqrstuvwxyzAB
UVWXYZ&!1234567890$
ned in 1955 by Adrian Frutig

RESTORATION OF IMAGES WITH UNDEFINED PIXEL VALUES

This is a continuation of application Ser. No. 08/045,954, filed Apr. 12, 1993, now abandoned.

BACKGROUND OF THE INVENTION

This invention relates to a method and apparatus for correcting defects in images, and in particular to a technique for correcting defects in images of documents, photographs, illustrations, and the like.

Images acquired by systems operating in the real world often contain defects or imperfections which cause the images to be inadequate as a starting point for subsequent use by people or machines. The defects or imperfections in images can arise from many causes, including imperfections in the optical system used to acquire the image, atmospheric effects, noise caused by electronic sensors, or other imperfections in the equipment or systems used to acquire the image. To compensate for these imperfections, researchers have long sought a wide range of methods for "restoring" the image.

The choice of the technique for image restoration in any particular application depends heavily upon the source of image degradation. One type of imperfection is common to images obtained from aerial cameras. Such images frequently exhibit blurring or distortion caused by camera motion or atmospheric effects. In these applications, the imaging device is physically distant from the object or objects whose image is being acquired.

Another class of image defects arises in document analysis. In document analysis, a part of the imaging device, for example the contact glass of a scanner, a photocopier, or the like, is physically close to the document. As a result, scratches and other blemishes are in virtually the same focal plane and introduce corresponding defects into the document image. Another imperfection in such systems arises from the electronic acquisition of data. Faulty electronic components can destroy the information content of the individual pixels, resulting in defects in the ultimate image produced by such equipment.

A well known technique for restoring information is to employ classical linear low pass filtering. In linear filtering, however, the diameter of the kernel employed for the filter must be at least on the same order as the diameter of the undefined pixel regions for useful computation to take place. This causes blurring to occur. Accordingly, low pass filtering has not been widely employed for image restoration in a document-handling context.

A further disadvantage of low (or high) pass filtering has been its tendency to alter valid image data, thereby degrading satisfactory portions of the image to enhance unsatisfactory portions. For an overall discussion of various digital image restoration techniques, see M. I. Sezan and A. M. Teklap, "Survey of Recent Developments in Digital Image Restoration," *Optical Engineering* (May 1990) 29(5):393–404.

Mathematical morphology methods have also been employed to recover information from noisy images using only local pixel information. See, for example, E. Doherty, *An Introduction to Morphological Image Processing*, SPIE Optical Engineering Press, Bellingham, Washington, 1992. Unfortunately, these methods rely on prior knowledge of the expected image, and so are not universally applicable.

SUMMARY OF THE INVENTION

We have developed a method for restoring images which have fixed regions of image data where the pixel values are known, and other fixed regions of image data where the pixel values are unknown. We term the areas in which the pixel values are unknown "dropout" areas, to emphasize that the values are unknown, not incorrect. In our method a threshold value and a neighborhood configuration are specified as initial conditions for the operation of the method. The neighborhood configuration defines a geometric region, typically of a fixed number of pixels, usually surrounding a target pixel to be restored. The threshold value specifies the number of pixels in the neighborhood configuration whose values must be known.

In the method, for each pixel in one of the dropout regions, analysis is performed over the entire region defined by the neighborhood configuration. Within that region the number of pixels which are not dropout pixels are counted. If this count exceeds the threshold value, then a value for the unknown pixel is calculated. In the preferred embodiment, the calculation consists of simply averaging the values of the pixels in the neighborhood configuration. The steps of analyzing unknown pixels and computing values continue until no unknown pixels remain which satisfy the criterion of having neighboring pixels exceeding the threshold value.

Next, the computed pixel values are returned to the undefined region, thereby reducing its size and adding to the set of pixels having known values. Then the steps of analyzing pixels with unknown values and comparing the result against a threshold value is repeated. This process continues until a small number (or zero) unknown pixels satisfy the threshold criterion. Then the threshold is decremented and the entire process is repeated. In this way, eventually all unknown pixels will be converted to known pixels, thereby restoring the image.

DESCRIPTION OF THE SPECIFIC EMBODIMENTS

Our invention is directed toward the problem of restoring images with undefined pixel values at known pixel locations. We term this technique "image continuation." In images of documents, unknown pixel values at known locations can have any of several causes, for example, a scratch or blemish on the contact glass of the scanner, a malfunction of a charge-coupled device sensor, an interruption in dam transmission, etc. Once identified, these known locations provide critical information that can be exploited to restore the image by "continuing" it from the reliable to the unreliable regions. We have developed a family of algorithms which accomplish image continuation using simple functions applied on successive iterations.

Our technique is particularly applicable to a class of image defects which are notable in that their shape and location can be anticipated. As one example, consider scratch marks which appear on photocopies. This shape typically will be a general shape which varies slightly with each copy, for example when two repeated scans create two images that are not quite identical. The defective area may occur in the same general place in each case, or it may be a cyclic occurrence, or occur in some other expected or predictable fashion.

Figure 1:
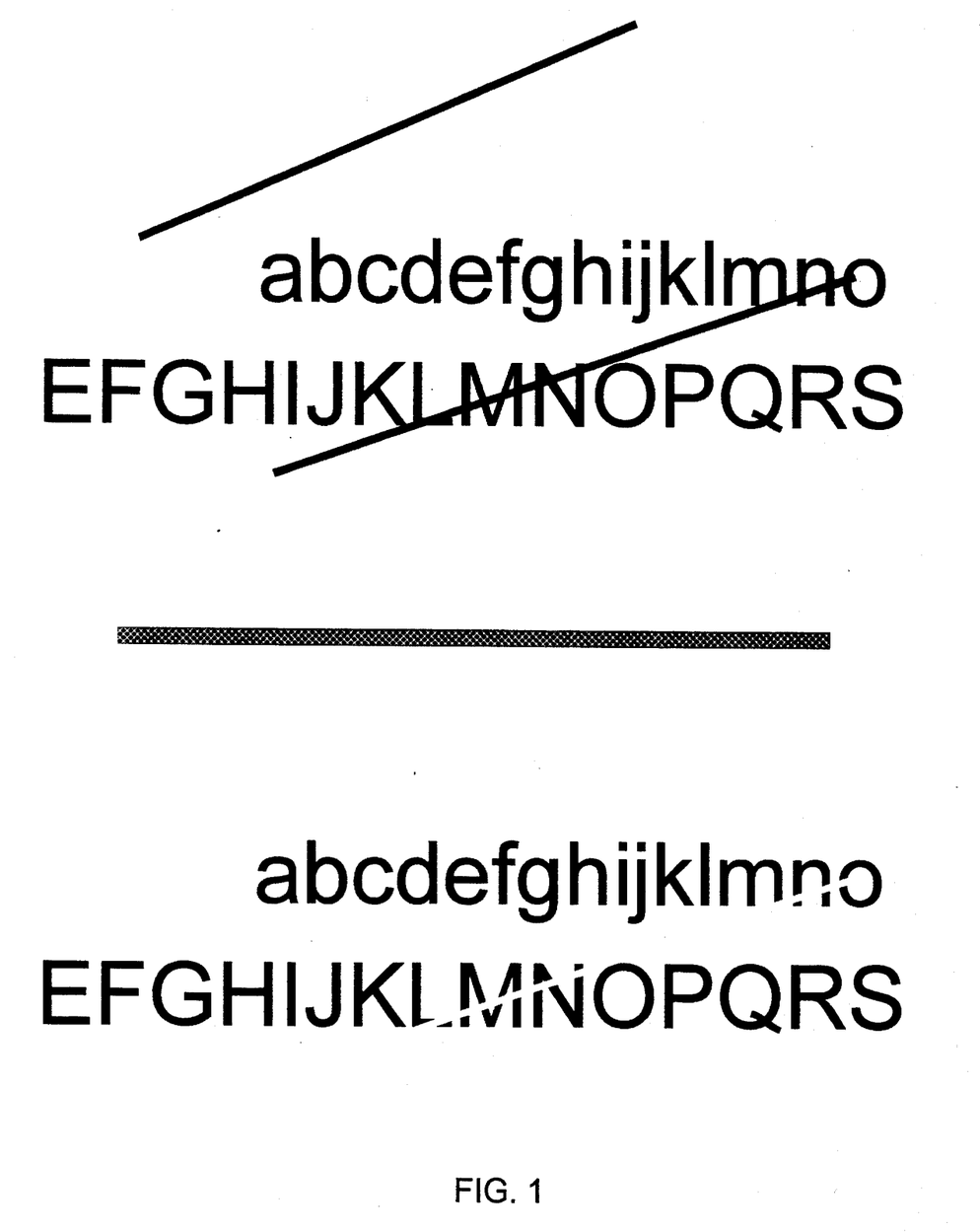
FIG. 1 illustrates two examples of a document to be restored.

FIG. 1 illustrates a "scratched" document. The only differences between the two portions of the figure are the contrast and brightness settings on the scanner. In the upper portion of FIG. 1 the scratched regions appear dark, while in the lower portion they appear light as a result of the contrast setting. For this type of defect, all documents scanned through the damaged scanner will be degraded by having almost exactly the same absolute pixel coordinates appear as "scratched." Pixels corresponding to the scratch have entirely unreliable values. As shown by FIG. 1, they cannot be known as black or white (or any other value). Their values are unknown.

This class of image defects is characterized by having invalid data values for a consistently repeatable set of pixel locations. The nature of this repeatable noise is unique compared to random noise. The additional location information allows the problem of correcting the image to be dealt with in a more specific and selective manner than when dealing with random noise.

Of course, scratches are only one possible cause of unreliable pixels. As described above, there may be numerous other causes, and for that reason the defective pixels are referred to herein as the "dropout set." The "dropout set" is the subset of pixels of a digital image whose values are unreliable. In FIG. 1 the dropout set consists of the two line-like subsets of pixels most easily seen in the upper portion of the figure.

Our algorithm uses local information at the pixel level for determining and setting values in known defect locations in the image. With successive passes through the set of defect locations, the image is "grown" into the defect areas. As the perimeters of the defect areas become known, the unknown area is eroded away until the defect area is completely erased.

Figure 2:
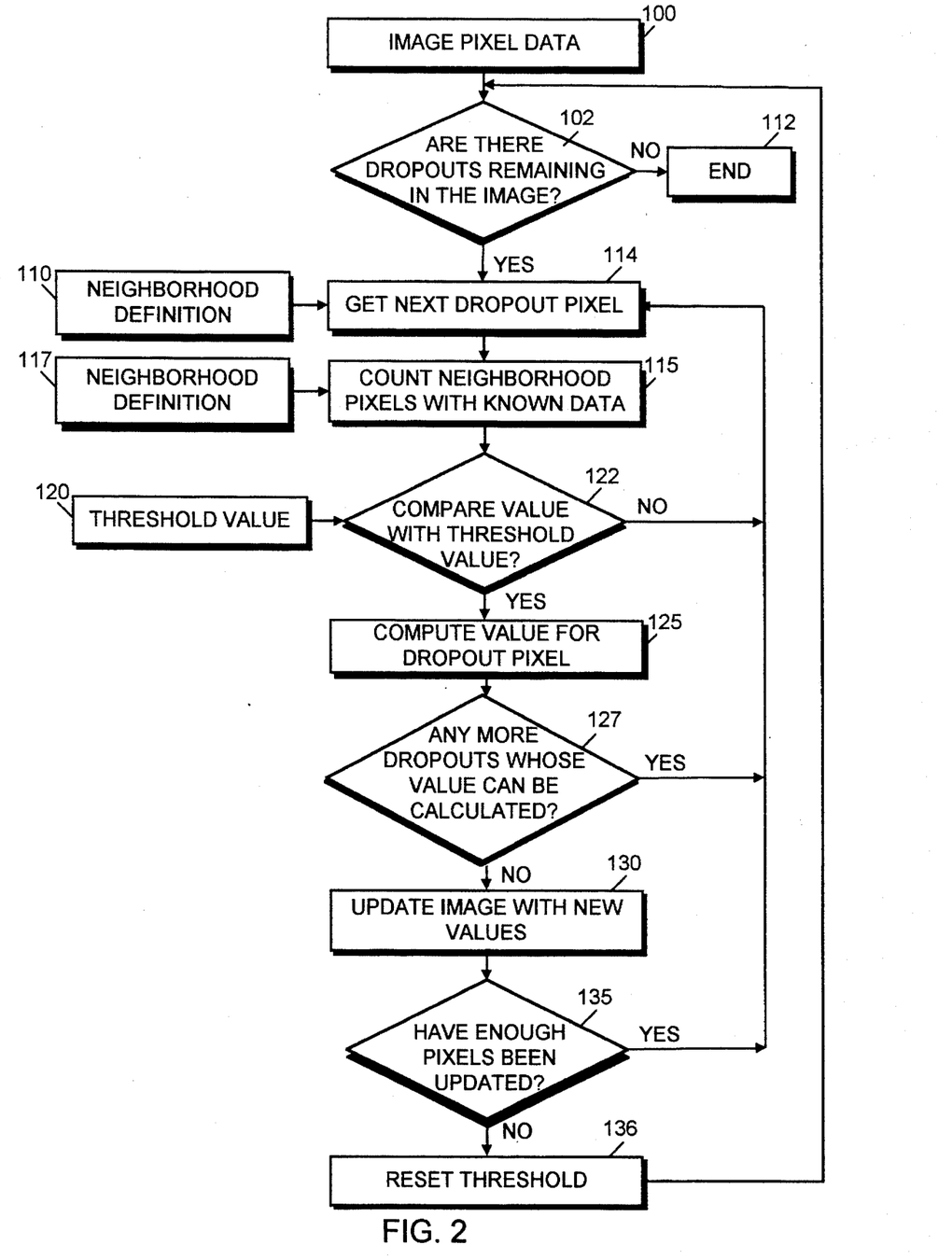
FIG. 2 is a flowchart illustrating a preferred embodiment of the method of our invention.

FIG. 2 is a flowchart which illustrates a preferred embodiment of our invention. The method relies upon image pixel data 100 having known dropout locations 110. As discussed, the dropout locations are locations in the image pixel data for which the pixel values are undefined or unknown. In the preferred embodiment, at the beginning of the process the image pixel data is analyzed to determine if there are any dropout pixels remaining in the image. This is accomplished by maintaining a record of the number and location of dropout pixels. When the number reaches zero (or an otherwise defined acceptably small number), the procedure ends at 112, and the process is complete.

If there are dropout pixels remaining in the image, the location of the next dropout pixel location is retrieved at step 114. At step 115 a count is made of the neighborhood pixels with known data. The neighborhood pixels are those pixels in the immediate vicinity of the dropout pixel. In the preferred embodiment, the neighborhood pixels consist of the 8 pixels surrounding the single pixel selected as the dropout pixel. These 8 pixels consist of the 3 pixels in the row above the dropout pixel, the 3 pixels in the row below the dropout pixel, and a single pixel to the left and fight of the dropout pixel.

It should be appreciated that this particular neighborhood arrangement is arbitrary. The neighborhood definition 117 is an initial parameter supplied to our system, and can be chosen to optimize the performance of the system for different types and qualities of images. For example, in other types of images a bulls eye pattern may be employed, a larger area pattern, or some other pattern selected. For unusual images the neighborhood might even be defined using pixels not in the vicinity of the dropout pixel being processed. Once the count of neighborhood pixels with known data is complete, the count is compared with the threshold value 120 at step 122.

The threshold value 120 is also an initial condition for the operation of our system. Typically, the threshold value is selected to be a number which corresponds to the number of pixels in the neighborhood which must have known values. In one embodiment this is 7 of the 8 pixels neighborhood pixels. The use of 7 of a neighborhood of 8 provides a high level of quality in the resulting image. For faster operation, lower threshold values may be selected, as will be discussed.

If there are not enough neighborhood pixels with known data to meet the threshold, the flow of the process returns to step 114 for selection of the next dropout pixel. On the other hand, if enough pixels are present having values to satisfy the threshold 120, then a new value is computed for the dropout pixel as shown by step 125. This new value can be computed by using any suitable technique. For example, using either the average of the surrounding pixels, or their mean, has been found satisfactory. Of course, other techniques involving weighted averages or more complicated mathematical operations, such as statistical correlations, and larger comparison areas may also be employed. Once the value of the dropout pixel is computed at step 125, a determination is made at step 127 about whether any more dropout pixels have values which can be calculated. If there are, then the next dropout pixel is obtained and flow of the process returns to step 114. If there are no more dropout pixels whose value can be calculated, the process continues to step 130. It should be understood that at this stage of the process a large number of dropout pixels may remain, but simply none of them have a sufficient number of surrounding pixels with known values to satisfy the threshold.

Assuming that there are no further dropout pixels whose value can be calculated, the image is updated with the new values. In other words, the formerly unknown pixels which now have calculated values are added back into the image as known pixels using the calculated values. This expands the set of "known" pixels and reduces the set of dropout pixels.

Next, as shown by step 135, a determination is made about whether "enough" dropout pixels have been updated. "Enough" can be any desired number, percentage, or other measure of pixels. The goal of this step 132 is to lessen the number of iterations of the system. For example, if each iteration through the preceding steps 114–130 is only computing a new value for one, two or a few pixels, the process can be carried out more efficiently by resetting the threshold. If enough (a large number) pixels were updated, flow of the process returns to step 114 for processing of the next pixel.

On the other hand, if only a small number of pixels were updated, as shown by the test 135, the threshold value can be reset at step 136 to expedite subsequent processing. Control then returns to step 102 for the next iteration. If no dropout pixels remain, the process ends at step 112.

In summary, the method described in FIG. 2 uses known information from the image and known information about the location of the defects. For each member of the dropout set of pixels, members of a local neighborhood in the image are considered. If enough neighborhood information is known, then the dropout location is marked and a value is saved for that location. After successive passes through the set of dropout locations, the image can be updated with the values of the marked locations, and then those same locations removed from the dropout set. This provides additional numbers of known pixels for subsequent processing. Once the process reaches a small enough set of dropout pixels, the threshold may be shifted as necessary, ultimately terminating when all dropout locations have received values. Although in the preferred embodiment the process terminates when all of the dropout pixels have been restored, it should be appreciated that not all need to be restored. In applications involving images where all pixel values are not required, fewer than all can be restored to expedite the process.

Because of the arbitrary nature of the source image, our approach makes no assumptions about the content of the original information. All necessary information is at the pixel level.

Figure 3:
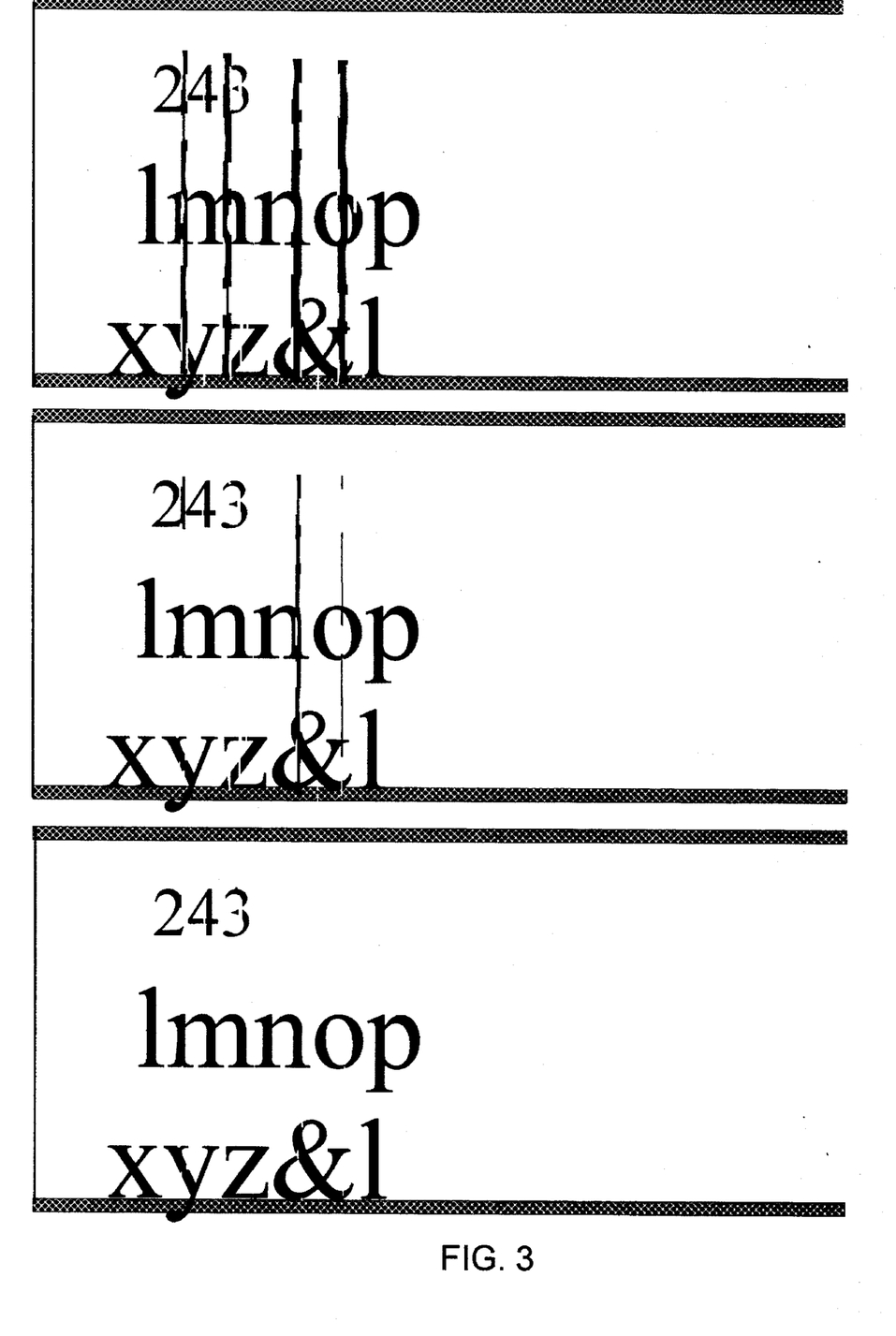
FIG. 3 is a diagram illustrating the process of our invention.

FIG. 3 is an illustration of the process of our invention as it progresses. The top portion of FIG. 3 is the original image with scratches, while the bottom is the resulting image after all processing. The middle portion reflects an intermediate stage of processing. For the example shown in FIG. 3, the neighborhood was defined as a square three pixels on a side. The thresholds employed for FIG. 3 were four for the top portion, three for the following portion, and zero for the final portion.

A particular advantage of the approach we use is that by shifting the threshold value in the manner described, the system focuses first on dropout pixels that are completely surrounded by pixels with values. After processing these dropout pixels and removing them from the dropout set, the threshold can be decreased appropriately, for example, by one pixel, then the system used to update dropout pixels having fewer known neighbors. Updating these pixels may result in other dropout pixels that previously had fewer known neighbors, now having a sufficient number of known neighbors. The threshold is held constant until few or essentially no further changes occur. By proceeding in this fashion, the image is completely restored. Furthermore, because each iteration operates on image pixels essentially independently of other unknown image pixels, updates on each iteration depend only on pixel values available at the end of the preceding iteration, not on values computed earlier in the iteration in progress. By proceeding in this manner, anisotropies that would be noticeable are removed. In addition, processing of the pixels can be handled in parallel using appropriate apparatus.

Experimental Results

Figure 4:
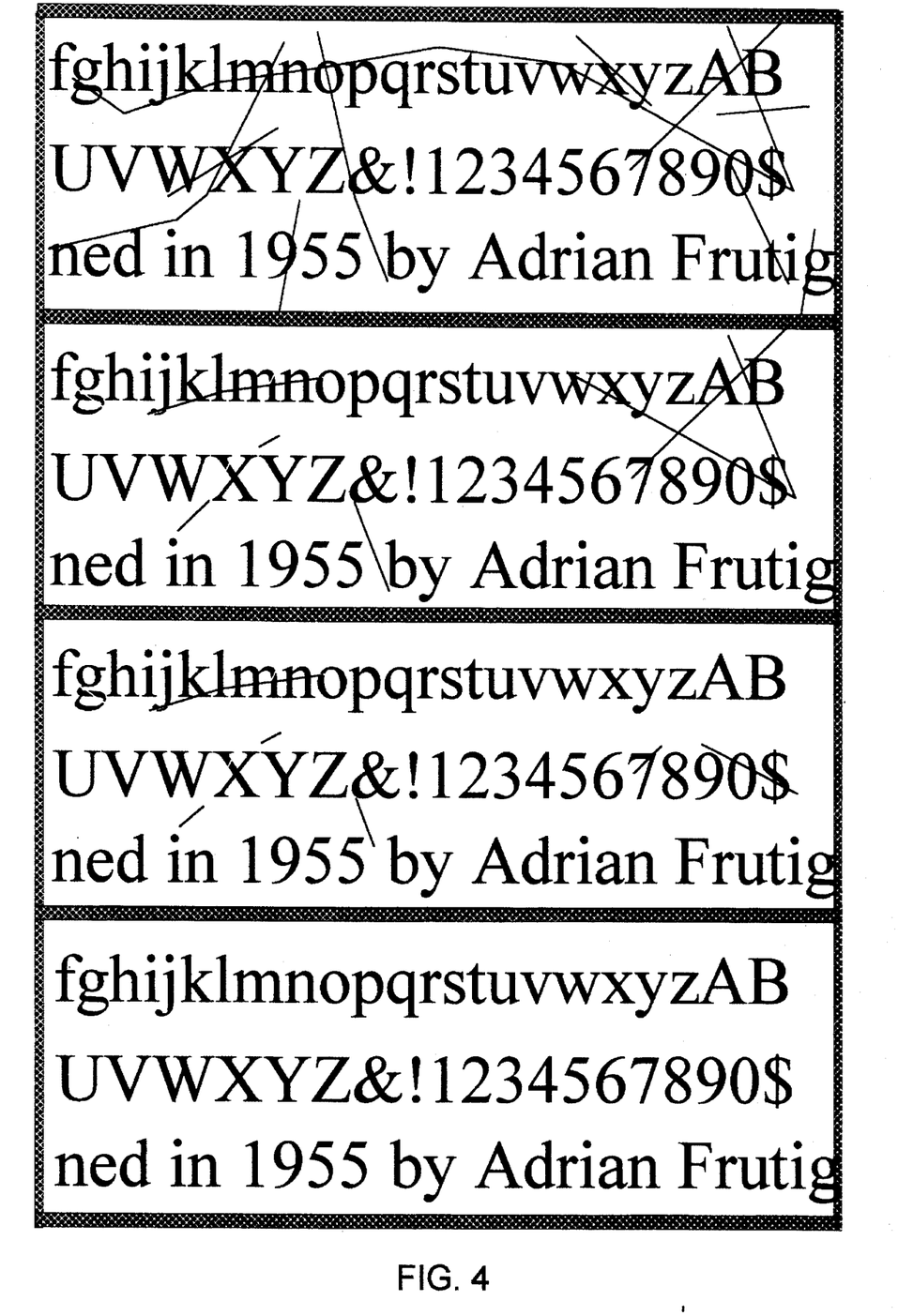
FIG. 4 is an illustration of the process of the invention applied to a text image having scratches.

We have applied the techniques of our invention to a series of images including 1-bit text images, 1-bit dithered images, 8-bit printed images, 8-bit continuous tone images, and 24-bit color images. The processing employed on the images discussed below has been done in a parallel manner, that is, the image data is only revised at the end of each pass through the list of defective pixels. FIG. 4 illustrates four states of an image during processing. The upper portion of the figure illustrates the original image with defect areas indicated by hairline marks. The lower portion of the figure presents the corrected image after processing. Two intermediate stages are also shown. As shown by this figure, the thinnest defect areas are determined first, because more neighboring pixels are known in these areas.

Figure 5:
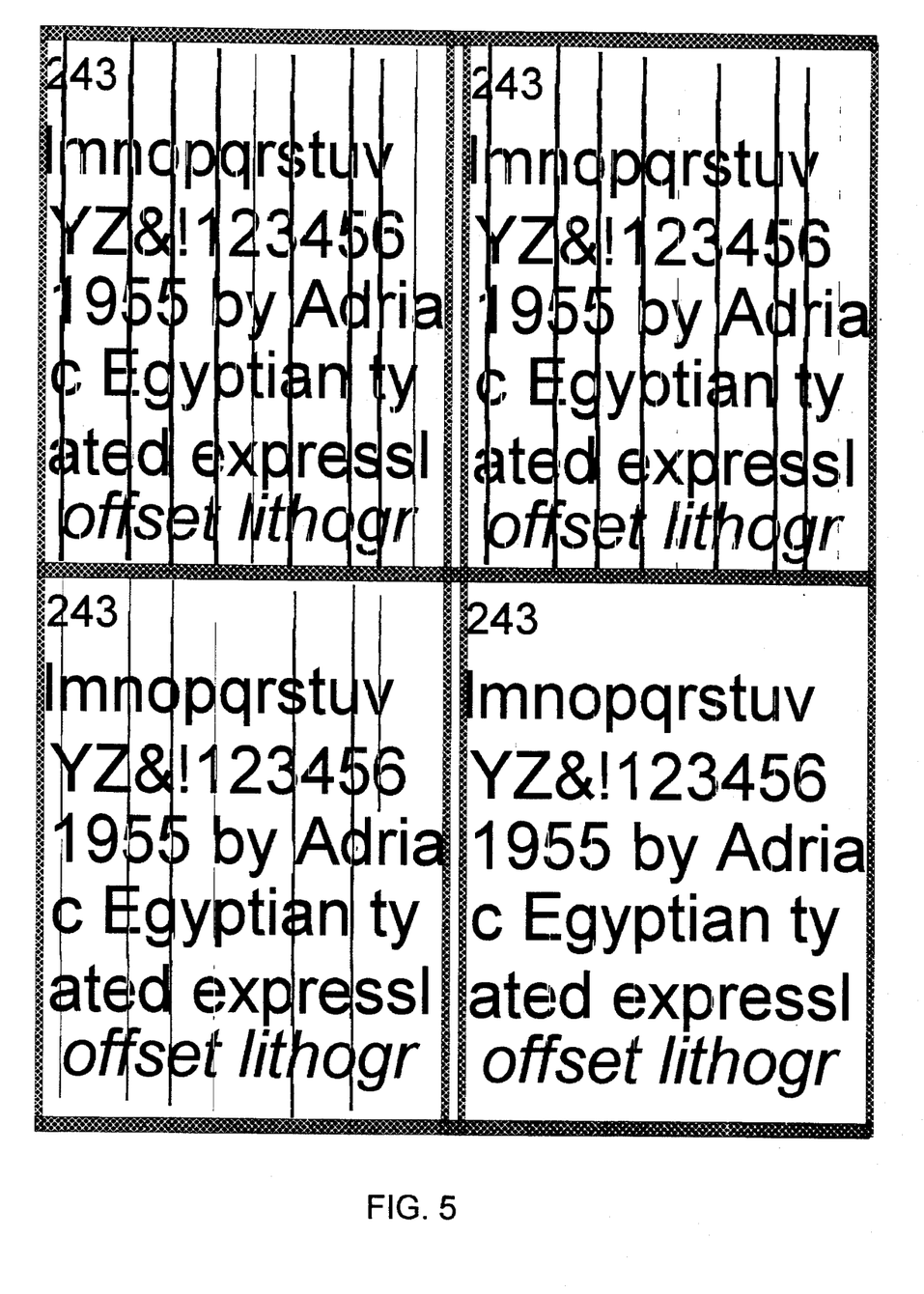
FIG. 5 is an illustration of the process of the invention applied to a text image having thick vertical defects.

FIG. 5 illustrates an image with thick vertical defects. Again, four states of the image during processing are shown. The upper left portion of FIG. 5 is the original image with the defect areas indicated by vertical dark marks. The lower right portion displays the corrected image after processing. For the examples shown in FIG. 5, the dropout "stroke" thickness is roughly equal to the width of the strokes used to form the text. As shown in FIG. 5, the image between the lines of text is correctly replaced by the surrounding white area due to the iterative thresholding nature of the algorithm. Also notice that when a dropout area aligns with a stroke used to form one of the letters which has white on one side and black on the other that the dropout pixel tends to take on a half white, half black nature. The "p" in the word "Egyptian" is one example. Also notice how well the correction mechanism maintains lines and line spacing.

Figure 6:
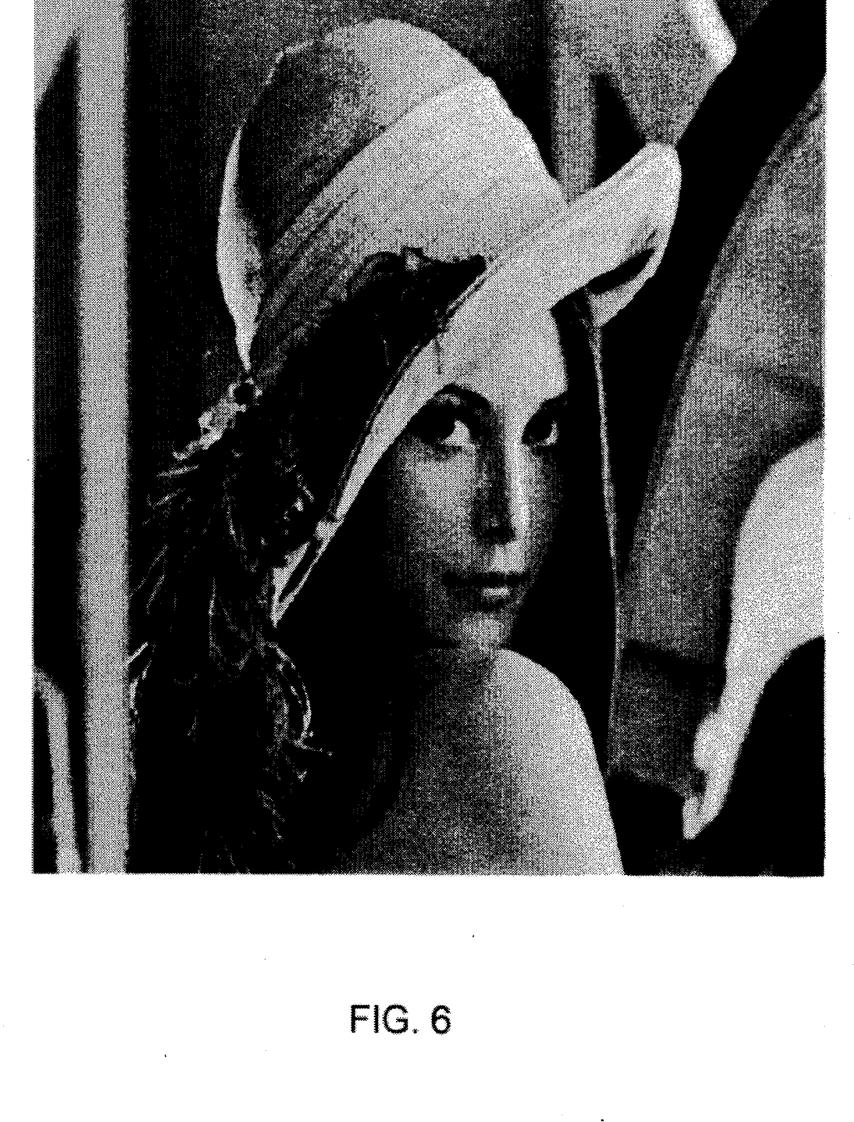
FIG. 6 is an original illustration of a photograph.
Figure 7:
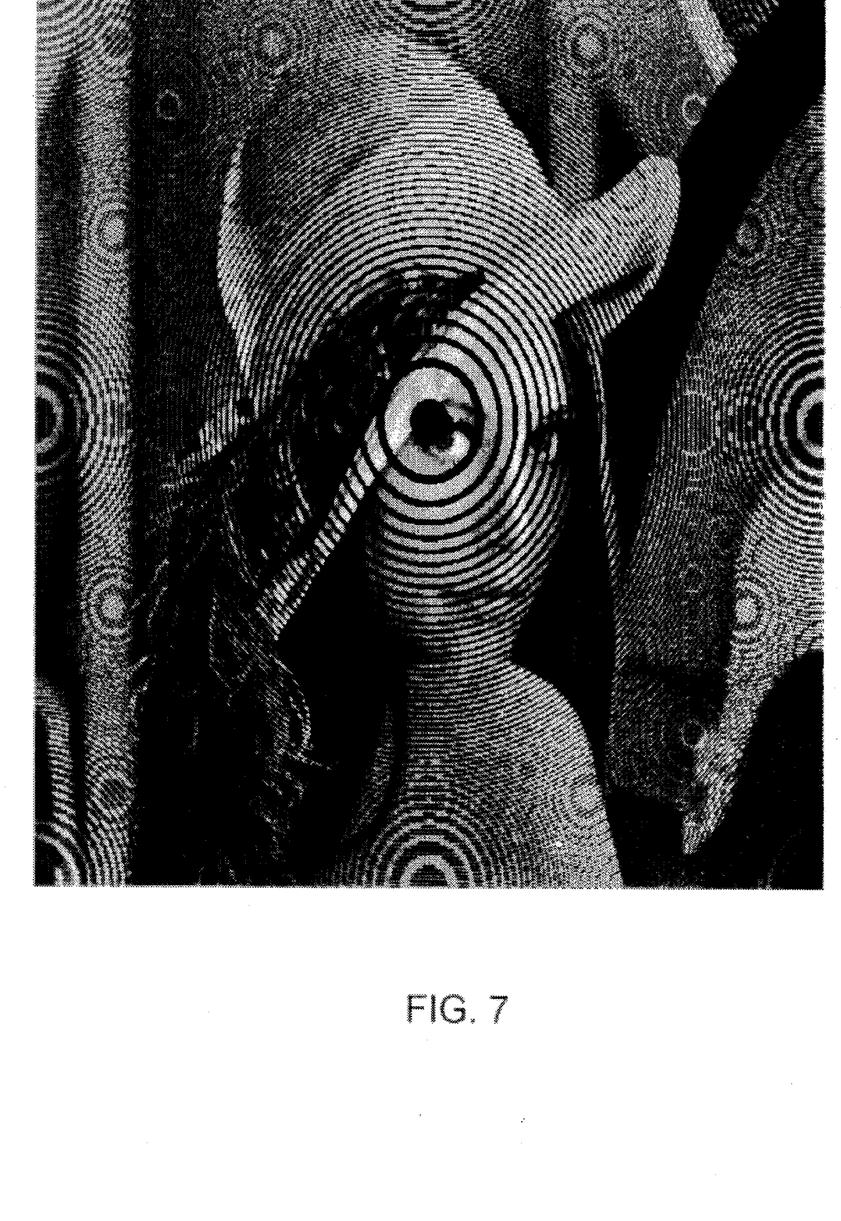
FIG. 7 is an illustration of the photograph after being damaged.

FIG. 6 is a copy of a photograph showing its appearance prior to "damage." FIG. 7 illustrates the appearance of the photograph after being "damaged," in this case intentionally to illustrate our image restoration technique.

Figure 8:
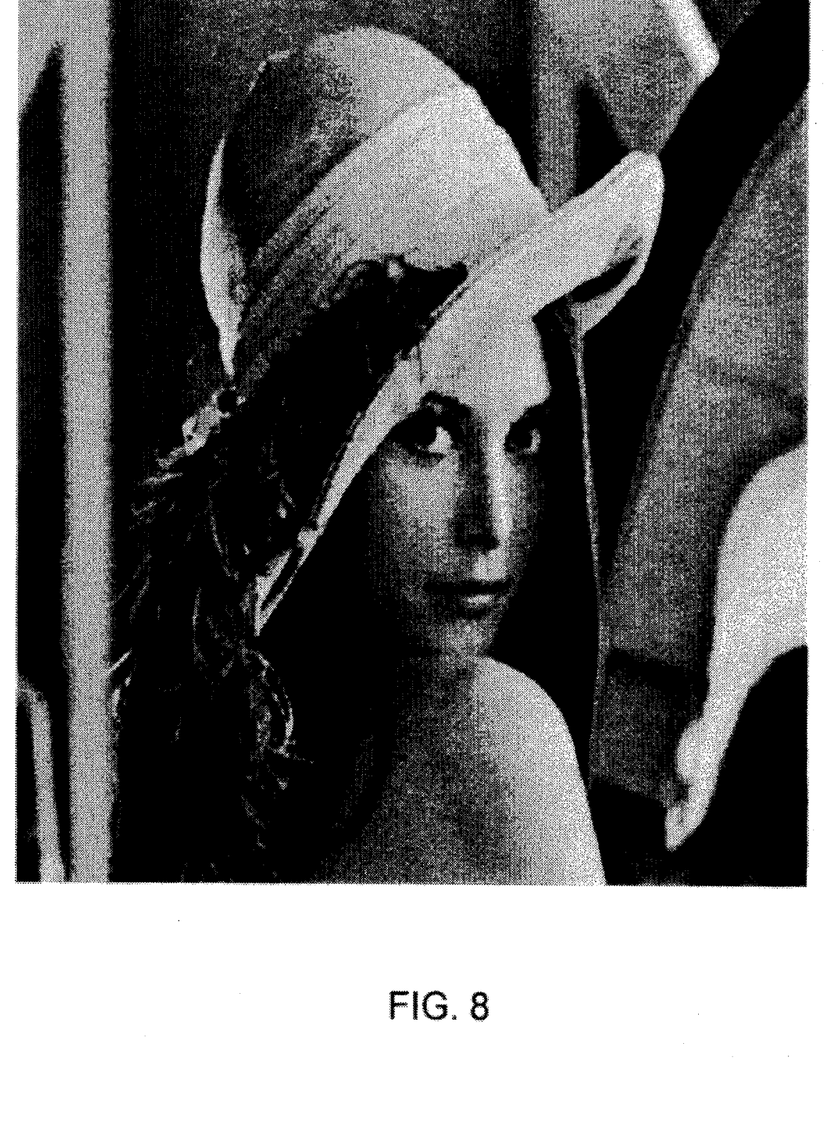
FIG. 8 is an illustration of the photograph after being restored using the process of our invention.

FIG. 8 is an illustration showing the appearance of FIG. 7 after FIG. 7 has been processed using the technique of our invention. As is apparent, close and careful study is required to determine which of FIGS. 6 or 8 is the original photograph.

We have determined that numerous variants of the technique of our invention are considerably faster, yet subjectively appear to yield almost as satisfactory image restorations. As described above, in one variation we decrement the threshold if the number of updated pixels is small, rather than zero. Lower threshold values are thus reached more quickly, enabling more dropout pixels to be updated in a single iteration, thereby requiring fewer iterations.

Another technique for updating more pixels per iteration is to begin the process with a threshold value with a smaller number. One can even begin the approach with a threshold value of 1, in other words, where any dropout pixel with at least one known neighbor, is updated. Even using the extreme initial threshold of 1 results in restoration of the original image, although the image does not appear subjectively of the quality of images restored using higher threshold values initially.

The technique of our invention provides numerous advantages over prior art techniques. In particular, defects of arbitrary size can be restored with a single fixed-size window using iterative processes. The technique is also successful in removing defects while maintaining line spacing in text. This provides a substantial advantage in the processing of alphanumeric information contained in documents.

Figure 9:
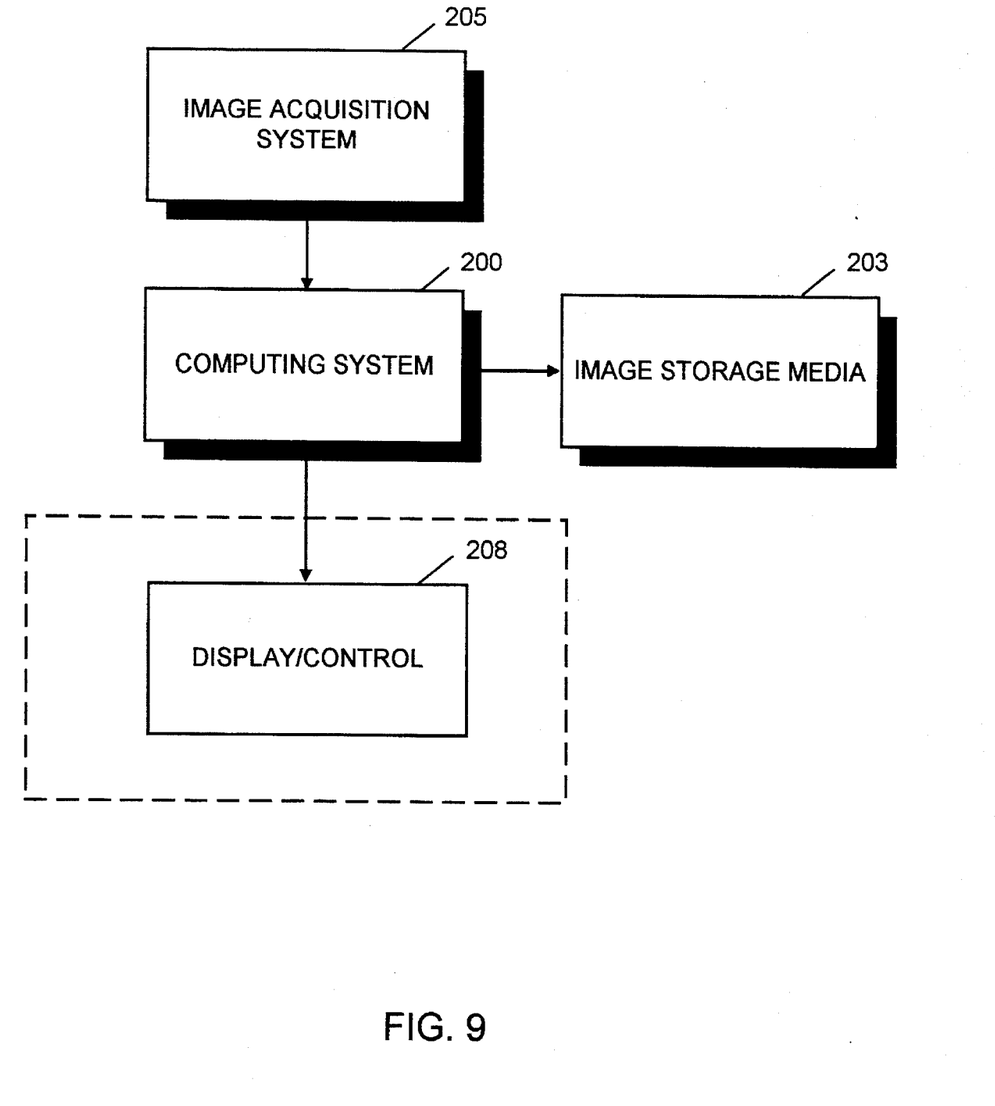
FIG. 9 is a block diagram illustrating a preferred embodiment of the system of our invention.

FIG. 9 is a block diagram illustrating a preferred embodiment of a system for carrying out our invention. As shown in FIG. 9 the system includes a computer system 200. The system can comprise any well known computing system, including a work station, or personal computer. The computing system is coupled to a form of media 203 for storing, at least temporarily, image information. Media 203 can include any well known type of semiconductor memory, hard disk storage, tape storage, or the like.

Also coupled to computing system 200 is an image acquisition system 205. As described above, the image acquisition system 205 preferably includes any well known system for acquiring images and converting them into an array of digital pixel values. For example, the image acquisition system may include a scanner, a facsimile machine, a photocopy machine, etc. The particular characteristics in the image acquisition system are not significant to the invention, as long as the image to be processed is converted from image information to digital information. In addition in some embodiments, also coupled to computing system 200 is a form of display and/or control means 208. Display and control means 208 can include a keyboard, a monitor, or other controlling systems for controlling the operation of the computing system 200. In other embodiments of the invention, the display and control system can consist of something as simple as an additional push button, or other simple apparatus for activating the system of our invention. In further embodiments, the display and control portion may be hidden from the user, to provide an embedded or automatic control system. For this reason, a dashed box encircles display/control means 208. The system shown in FIG. 9 operates under control of computer programs to carry out the image continuation and restoration techniques of our invention.

The foregoing has been a description of the preferred embodiments of our system. It should be understood that the techniques we have developed are broadly applicable to a wide range of images and equipment. Accordingly, the scope of the invention is defined by the appended claims.

What is claimed is:

1. A method for restoring pixels in an image having pixels of known values and pixels to be restored having unknown values, the method comprising the steps of:
   (a) obtaining, external to the image, an indication of which pixels have unknown values;
   (b) specifying a threshold value and a neighborhood configuration, the neighborhood configuration defining a window;
   (c) restoring each pixel having an unknown value, by the steps of:
      (1) positioning the window relative to the pixel being restored;
      (2) counting the number of pixels of known value in the window to obtain a known pixel count;
      (3) if the known pixel count exceeds the threshold value, determining a restored pixel value as a function of the pixel values for pixels in the window which have known values;
      (4) if the known pixel count exceeds the threshold value, assigning the restored pixel value to the pixel being restored; and
      (5) repeating the above steps (1)–(4) until at least a selected number of pixels of unknown value are assigned restored pixel values; and
   (d) adjusting the threshold value if desired and repeating step (c) above until no more than a desired quantity of pixels of unknown value remain.

2. A method as in claim 1 wherein the step of determining a restored pixel value is a step of determining an average of the pixel values for pixels in the window which have known values.

3. A method as in claim 1 wherein the step of determining a restored pixel value is a step of determining a weighted average of the pixel values for pixels in the window which have known values.

4. A method as in claim 1 wherein the step of determining a restored pixel value is a step of determining a rounded value of a weighted average of the pixel values for pixels in the window which have known values.

5. A method as in claim 1 wherein the neighborhood configuration comprises a geometrical region immediately adjacent to and encompassing the pixel to which the neighborhood configuration is relative.

6. A method as in claim 1 wherein the threshold value is a number smaller than the number of pixels in the neighborhood.

7. A method as in claim 1 wherein the pixels are arranged in a matrix and the neighborhood comprises a 3×3 region.

8. A method as in claim 7 wherein the threshold value is 7.

9. A method as in claim 1 wherein step (d) further includes the step of decrementing the threshold value by one.

10. A method as in claim 1 wherein the step of specifying a threshold value includes a step of specifying a threshold value dependent on the pixel values of pixels in the window.

11. A method as in claim 1 wherein the desired quantity of pixels of unknown value is zero.

12. A method as in claim 1 wherein the image comprises a gray scale image.

13. A computing system for restoring pixels in an image having pixels of known and unknown values, the system comprising:
   (a) means for reading an indication of the locations of pixels of unknown values into the computing system independent of the image;
   (b) means for specifying a threshold value and a neighborhood configuration;
   (c) means for restoring a pixel having an unknown value, comprising:
      (1) means for defining a window surrounding the pixel being restored, the window defined by the neighborhood configuration;
      (2) means for determining if a count of the number of pixels of known value in the window exceeds the threshold value;
      (3) means for calculating a restored pixel value from pixel values of known pixels in the window; and
      (4) means for assigning the restored pixel value to the pixel being restored; and
   (d) means for controlling the means for restoring to repeat until no more than a desired number of pixels remain to be restored.

* * * * *